United States Patent
Scaglione et al.

(10) Patent No.: US 11,848,989 B2
(45) Date of Patent: Dec. 19, 2023

(54) SEPARATE ROUTING OF NVME-OVER-FABRIC PACKETS AND NON-NVME PACKETS

(71) Applicant: HEWLETT PACKARD ENTERPRISE DEVELOPMENT LP, Houston, TX (US)

(72) Inventors: Giuseppe Scaglione, Granite Bay, CA (US); Charles Tuffli, Roseville, CA (US); Brian P. L'Ecuyer, Elk Grove, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 9 days.

(21) Appl. No.: 17/612,122

(22) PCT Filed: May 30, 2019

(86) PCT No.: PCT/US2019/034550
§ 371 (c)(1),
(2) Date: Nov. 17, 2021

(87) PCT Pub. No.: WO2020/242474
PCT Pub. Date: Dec. 3, 2020

(65) Prior Publication Data
US 2022/0232074 A1    Jul. 21, 2022

(51) Int. Cl.
*H04L 67/1097* (2022.01)
*H04L 45/52* (2022.01)
*H04L 69/18* (2022.01)

(52) U.S. Cl.
CPC .......... *H04L 67/1097* (2013.01); *H04L 45/52* (2013.01); *H04L 69/18* (2013.01)

(58) Field of Classification Search
CPC ...... H04L 67/1097; H04L 45/52; H04L 69/18
See application file for complete search history.

(56) References Cited

U.S. PATENT DOCUMENTS

| | | | |
|---|---|---|---|
| 8,424,053 | B2 | 4/2013 | Gottimukkala et al. |
| 8,705,342 | B2 | 4/2014 | Yu et al. |
| | | (Continued) | |

FOREIGN PATENT DOCUMENTS

| | | |
|---|---|---|
| JP | 2016528809 A | 9/2016 |
| KR | 10-2018-0134745 A | 12/2018 |
| WO | WO-2017176775 A1 | 10/2017 |

OTHER PUBLICATIONS

Cisco, "Best Practices for Deployments Using DCB and RoCE," White Paper, Jun. 2015, 23 pages, https://www.roceinitiative.org/wp-content/uploads/2016/11/elx_wp_all_best-practices_deployments_dcb_roce_cisco.pdf.

(Continued)

*Primary Examiner* — Viet D Vu
(74) *Attorney, Agent, or Firm* — Hewlett Packard Enterprise Patent Department

(57) ABSTRACT

Non-volatile memory express (NVMe) is a data transfer protocol used to enable high-speed data transfer between a host computer system and a solid-state drive (SSD). NVMe may be implemented over network fabrics and referred to as NVMe over fabrics (NVMe-oF). Access to SSD storage over network fabrics via NVMe-oF allows software defined storage to scale to allow access to a number of NVMe devices and extend distances between devices within a datacenter over which NVMe devices may be accessed. A network device is provided to automatically detect, prioritize, and route NVMe network packets in a network that includes multiple data communication protocols. For example, the network device may obtain network packets, analyze network packets to identify packet type and protocol, and redirect the network packets based on the analysis and detection. Thus, a processing priority may be provided (Continued)

for NVMe packets to assist in lossless communication implementations for storage across a network.

20 Claims, 10 Drawing Sheets

(56) References Cited

U.S. PATENT DOCUMENTS

| | | | |
|---|---|---|---|
| 9,491,201 B2 | | 11/2016 | Bagepalli et al. |
| 9,634,944 B2 | * | 4/2017 | Chinnaiah Sankaran .................. H04L 47/805 |
| 9,686,203 B2 | | 6/2017 | DeCusatis et al. |
| 9,692,560 B1 | | 6/2017 | Galon et al. |
| 9,747,249 B2 | | 8/2017 | Cherian et al. |
| 9,990,139 B2 | | 6/2018 | Nadakuditi et al. |
| 10,572,180 B1 | | 2/2020 | Nemawarkar et al. |
| 11,042,302 B2 | * | 6/2021 | Benisty ............... G06F 13/1668 |
| 2007/0100979 A1 | | 5/2007 | Soland et al. |
| 2007/0297333 A1 | * | 12/2007 | Zuk ..................... H04L 63/1416 370/235 |
| 2008/0148270 A1 | | 6/2008 | Gopisetty et al. |
| 2008/0256239 A1 | | 10/2008 | Gilde et al. |
| 2011/0019669 A1 | * | 1/2011 | Ma ....................... H04L 45/302 370/389 |
| 2015/0248366 A1 | | 9/2015 | Bergsten et al. |
| 2015/0370742 A1 | | 12/2015 | Breakstone et al. |
| 2017/0177216 A1 | | 6/2017 | Freyensee et al. |
| 2017/0177541 A1 | | 6/2017 | Berman et al. |
| 2019/0004988 A1 | | 1/2019 | Elkington et al. |
| 2019/0089639 A1 | | 3/2019 | Dhanabalan |
| 2019/0102093 A1 | | 4/2019 | Parnell et al. |
| 2019/0114278 A1 | | 4/2019 | Olarig et al. |
| 2020/0117525 A1 | | 4/2020 | Kachare et al. |
| 2020/0326868 A1 | | 10/2020 | Yang et al. |
| 2021/0111996 A1 | * | 4/2021 | Pismenny ............. H04L 45/566 |

OTHER PUBLICATIONS

Hampel, D., "New Storage Infrastructure with Flash and NVMe Over Fabrics," 2017, 56 pages, Brocade Communications Systems, Inc.

Intel, "Intel Rack Scale Design (Intel RSD) Pooled System Management Engine (PSME)," User Guide Software v2.4, Revision 1, Doc. # 608486-001, Apr. 2019.

Arista, "Deploying IP Storage Infrastructures," Arista White Paper, 2014, https://solutions.arista.com/hubfs/Arista/White_Papers/Deploying_Storage_Net_WhitePaper.pdf.

Cisco, "Cisco MDS 9000 Family Quality of Service," Mar. 30, 2006, https://www.cisco.com/c/en/us/products/interfaces-modules/storage-networking-modules/index.html.

International Search Report and Written Opinion received for PCT Application No. PCT/US2019/034550, dated Feb. 28, 2020, 10 pages.

Opportunities from Our Compute, Network, and Storage Inflection Points, (Web Page), Retrieved Dec. 24, 2018, 19 Pgs.

Pavic, N., IBM Pure Systems, (Research Paper), Aug. 16, 2012, 18 Pgs.

* cited by examiner

SEPARATE ROUTING OF NVME-OVER-FABRIC PACKETS AND NON-NVME PACKETS

BACKGROUND

Some Information Technology departments in corporations have started budding theft computer infrastructure to be, as much as possible, defined by software. Typically, this software-defined infrastructure sometimes relies on a hyper-converged infrastructure (HCI) where different functional components are integrated into a single device. One aspect of an HCI is that components of hardware may be virtualized into software defined, and logically isolated representations of computing, storage, and networking for a computer hardware infrastructure. HCI and virtualization of hardware resources may allow the allocation of computing resources to be flexible. For example, configuration changes may be applied to the infrastructure and the underlying hardware simply adapts to a new software implemented configuration. HCI may further be used by some corporations to implement a virtualized computer by completely defining the computers capability specification in software. Each virtualized computer (e.g., defined by software) may then utilize a portion of one or more physical computers (e.g., the underlying hardware). One recognized result of virtualization is that physical computing, storage, and network capacity may be more efficiently utilized across an organization.

NVM Express (NVMe) is a data transfer protocol typically used to communicate with Solid-State Drives (SSDs) over a Peripheral Component Interconnect Express (PCIe) communication bus. There are many different types of data transport protocols that exist for different uses within computer systems. Each transport protocol may exhibit different characteristics with respect to speed and performance and therefore each protocol may be applicable for different uses. NVMe is an example of a data protocol that may be used to enable high-speed data transfer between a host computer system and an SSD. NVMe is commonly used in computers that desire high-performance read and write operations to an SSD. Utilizing NVMe based storage that is capable of supporting high-performance read and write within a software defined infrastructure further utilizing HCI hardware may represent a useful and adaptable configuration for infrastructure networks.

A specification for running NVMe over fabrics (NVMe-oF) was started in 2014. One goal of this specification was extending NVMe onto fabrics such as Ethernet, Fibre Channel, and InfiniBand or any other suitable storage fabric technology. Access to SSD drives over network fabrics via NVMe-oF may allow software defined storage capacity (e.g., portions of a larger hardware storage capacity) to scale for access. This scaling for access may: a) allow access to a large number of NVMe devices; and b) extend a physical distance between devices (e.g., within a datacenter). Scaling may include increasing distances over which NVMe storage devices may be accessed by another computing device. Storage protocols are typically lossless protocols because of the nature of storage goals. If a protocol used for storage is lossy (lossy is the opposite of lossless), proper storage of data is likely going to exhibit unacceptable slowness (e.g., due to packet transmission retries) or even worse may present corruption (e.g., data inaccuracies) and therefore not be useable within a real-world computer environment, NVMe-oF traffic on the network fabric is therefore implemented to be lossless. NVMe-oF network packets may be transmitted on a network with other traffic. Thus, NVMe-oF traffic on intervening devices (e.g., such as network switches providing the network fabric between host device and storage device) may be on the same physical transport medium (e.g., optical or electronic cable) as other types of data.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not be implemented with serial processing and therefore functions may be performed in an order different than shown or possibly in parallel with each other. For a detailed description of various examples, reference will now be made to the accompanying drawings, in which.

DETAILED DESCRIPTION

Figure 1:
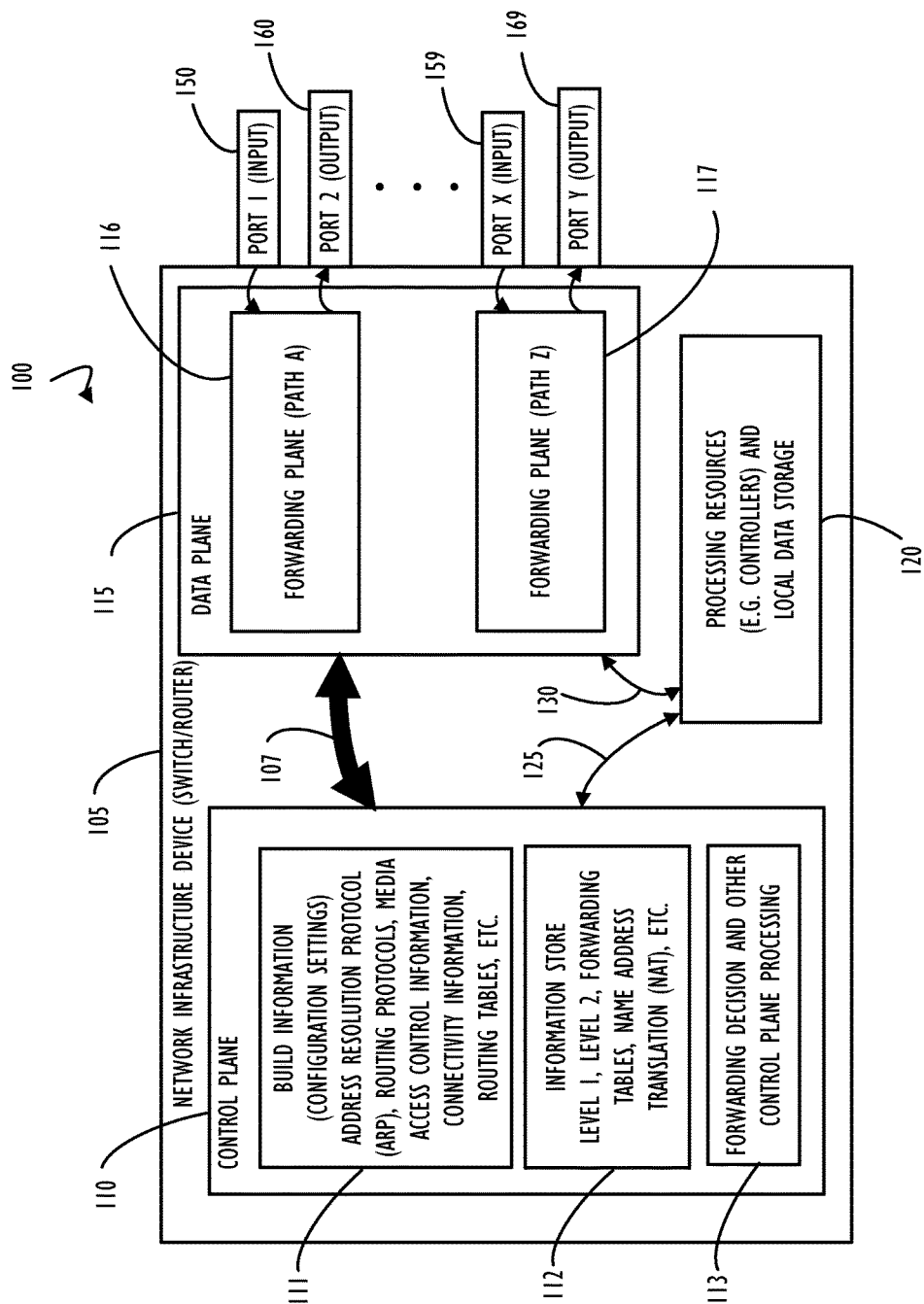
FIG. 1 is a functional block diagram representing an example of a network infrastructure device such as a switch/router, according to one or more disclosed implementations.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A computer network may be composed of many devices that have the ability to communicate between each other. To assist in this communication, a variety of network infrastructure devices such as switches and routers may also be connected to the network. Network infrastructure devices may assist in network communication by intercepting and redirecting network packets as appropriate to make communications between devices virtually seamless. These network infrastructure devices may perform complex tasks as part of enabling the seamless communication between devices. Some network infrastructure devices, for example, may store network packets in memory for a short period of time. This temporary storage of network packets may be necessary when, for example, the sender of the network packets transmits packets faster than the receiver of the network packets can receive the packets. Other implementations may use over-subscription or over-allocation of network bandwidth to essentially eliminate a potential for congestion. For example, a data communication flow expected to have a peak utilization of 1 MB/s may be allocated 5 MB/s of bandwidth. A cumulative effect of over-allocation and over-subscription may be considered inefficient with respect to "wasted" bandwidth.

Network infrastructure devices may utilize multiple techniques to handle the temporary storage of network packets for further processing. A common technique is to use the concept of a queue to store network packets. A queue may allow network packets to be stored and transmitted in the order in which they arrived by following a simple first-in, first-out (FIFO) ordering. The network infrastructure device may have a limited amount of storage capacity for network packets and may discard some network packets that are unable to be delivered to the receiver before an appropriate time limit expires (referred to as "dropping packets"). Many network protocols are resilient to lost network packets and may simply request the sender to re-transmit any lost network packets.

Some network protocols, however, may be considered "lossless" protocols that do not handle packet loss well. That is, lossless protocols are not designed to account for dropped packets, in part, because these protocols expect all packets to arrive in order. Protocols used to interface to storage devices (e.g., SSDs) are typically lossless protocols. NVMe may be a protocol considered for lossless protocol implementations and is typically implemented using an underlying lossless transport. In cases where lossless protocols are utilized, the network infrastructure device may be configured to handle network traffic in a manner that ensures all packets are delivered successfully by using the concept of a lossless queue. A lossless queue, much like any other queue, may follow the same FIFO network packet delivery ordering as a normal queue. A lossless queue, however, may not discard network packets until they are delivered to a receiver. In some implementations, the sender may be instructed to slow down or stop transmission of packets to an overloaded queue (e.g., for a period of time until full speed transmissions may be resumed). The network infrastructure device, having a limited amount of memory in which to store network packets, may instruct the sender to pause for a short time until the lossless queue is able to process and flush some of the stored network packets.

NVMe-oF traffic on the network fabric is implemented to be lossless given that reads and writes that are not lossless will likely lead to transmission slowness or even data corruption. A user of any computer may understand that reading and writing data to a computer's drive or other storage device should result in all reads and writes successfully processing. A college student, for example, would be very unlikely to accept that it takes a long time to transmit a copy of their term paper, or even worse, that their term paper is missing pages or updates when operations to save the data to a storage device were discarded due to writes being deemed optional.

NVMe-oF network packets for performing read and write operations may be exposed to network infrastructure devices such as network switches or routers that have the capability to handle the NVMe-oF traffic without losing NVMe-oF network packets. Network infrastructure devices may support lossless port queues using methods, such as the Priority Flow Control (PFC) standard 802.1Qbb. Using lossless queues in a network device may be complicated because a single network device may process both lossless protocols and lossy protocols simultaneously. To address this complication and other issues, disclosed techniques represent an improvement to the functioning of computer devices whereby a network switch, for example, may separate NVMe-oF network packets from non-NVMe-oF network packets and provide a higher level of processing (e.g., higher priority and lossless) for NVMe-oF packets as opposed to Non-NVMe-oF packets. Non-NVMe-oF network packets, unlike NVMe-oF network packets, may form network data streams that are more resilient of network packet loss and may therefore not utilize a lossless queue. A lossless queue, in this context, is a temporary storage location where network packets may be stored until they are transferred to a receiver and the transfer is acknowledged. A lossless queue may utilize more computing power or memory resources to operate in a network infrastructure device that may have a limited amount of computing and memory resources. Using a lossless queue for all network packets in a network infrastructure device that may have limited computational resources available may be infeasible.

Some methods of separating NVMe-oF network packets from non-NVMe-oF network packets may be implemented by a network infrastructure device configured to allow NVMe-oF network packets to be handled without loss. One method of separating NVMe-oF network packets from non-NVMe-oF network packets may be to configure the network infrastructure device to recognize network packets originating from specific internet protocol (IP) addresses as NVMe-oF packets (even if they are not NVMe-oF in reality). Network packets from an IP address defined as a source of NVMe-oF network packets may then be routed to lossless queues while non-NVMe-oF network packets (from other IP addresses) may be routed to other queues that may not need to provide lossless handling. As new sources of NVMe-oF network packets are added to the network or existing sources of NVMe-oF network packets are removed, the network infrastructure device may be updated (possibly a manual update) to recognize (based on P address definition) network packets originating from the new or updated IP address. For large-scale deployment of NVMe devices to be accessed via NVMe-oF over a network fabric, the need to constantly update the configuration of a network infrastructure device in response to network changes may be undesirable. Further, some packets that are not NVMe-oF may be provided the higher-level processing even if they are not actually NVMe-oF protocol packets. That is, definitions of configurations based on IP address alone may not result in an accurate identification of network packet protocols.

This disclosure describes an improvement over the previously provided methods that may be dependent upon IP addresses and corresponding frequent configuration changes (sometimes manual) to the network infrastructure device. According to disclosed implementations, NVMe-oF network packets may be automatically discerned from non-NVMe-oF network packets by a network infrastructure device that can recognize key parts of NVMe-oF network packets that do not exist in non-NVMe-oF network packets. These key parts may be thought of as a "signature" of an NVMe-oF packet. The ability to recognize network packets as NVMe-oF network packets may reduce or eliminate continually re-configuring network infrastructure devices as the number of NVMe devices connected to the network fabric changes. Further, in the same or in an additional disclosed implementation, the network infrastructure device may be configured to route automatically identified NVMe-oF network packets to one or more lossless queues, in addition to automatically recognizing NVMe-oF network packets by their signature. As mentioned above, there may be different underlying formats of data transfer for NVMe with the recognized abbreviation for NVMe over PCIe being "NVMe/PCIe." NVMe over Fabrics, when used agnostically with respect to the transport, is abbreviated "NVMe-oF." NVMe over remote direct memory access (RDMA) is abbreviated "NVMe/RDMA." NVMe over Fibre Channel is abbreviated "NVMe/FC" and NVMe over transport control protocol (TCP) is abbreviated "NVMe/TCP." As other protocols are associated with NVMe it is expected that other abbreviations may be defined. As will be apparent to those of ordinary skill in the art, given the benefits of this disclosure, the techniques of this disclosure are applicable to existing and future implementations of transports that may be used in a like manner to the examples of this disclosure.

Routing rules of a network infrastructure device (e.g., switch/router) may be stored in Ternary Content Addressable Memory (TCAM) tables to provide fast resolution of the routing rules for NVMe-oF network packets, TCAM may be described as specialized high-performance memory that may be used by network infrastructure devices to quickly resolve routing rules.

In some implementations, the disclosed network infrastructure device may be programmed to allow the lossless queue to fill to a certain threshold before sending instructions to senders of NVMe-oF network packets requesting that the senders temporarily pause transmissions. Then, as the lossless queue is emptied by the network infrastructure device sending NVMe-oF packets to the intended destination, the network infrastructure device may issue a command to previously paused senders requesting they resume sending network packets. The pause and resume operation may be implemented to prevent the lossless queue from filling and forcing the network infrastructure device to discard NVMe-oF network packets due to lack of memory available for network packet storage. Implementations using pause and resume operations may use different configurable thresholds with respect to when to issue either or both of the pause and resume commands.

As briefly mentioned above, some disclosed implementations may identify NVMe-oF network packets automatically, at least in part, by inspecting the properties of all network packets. Once obtained for inspection, network packets may be analyzed to identify information (e.g., a signature as discussed further below) that may be unique to NVMe-oF network packets. For example, network packets using the Remote Direct Memory Access (RDMA) over Converged Ethernet protocol (known commonly as the RoCE protocol) may be identified by the EtherType value in the packet having an assigned hexadecimal number equal to "0x8915". The EtherType in this context is a two-octet field in an Ethernet packet that indicates the protocol encapsulated in the packet. In a similar example, RoCE version 2 protocol network packets may be identified as encapsulated in User Datagram Protocol (UDP) packets with a destination port 4791 or 4420 (as assigned by the Internet Assigned Number Authority (IANA)).

There are many possible current and future protocols that may be used to form NVMe-oF network packets. As a further example, identifying NVMe-oF network packets using the Internet Wide-Area RDMA protocol (iWARP) may be performed by identifying Transmission Control Protocol (TOP) network packets with a destination port 4420. Similarly, the protocol using NVMe over TOP may be associated with other TOP network packets (e.g., control packets) with characteristics that may be used to assist in identification of NVMe-oF network traffic. Any protocol's identifying uniqueness may be utilized to automatically identify NVMe-oF network packets for automatic routing to lossless queues. Some disclosed implementations may use an extensible "rules-based" signature as a technique for identifying NVMe-oF network packets. Thus, in those example implementations, an update to the rules would provide for recognition of additional (and possibly future) signatures associated with NVMe-oF network packets. In some disclosed implementations examples refer to specific addresses and port numbers, however, any type of signature to identify a type of NVMe-oF protocol may be used and these signatures may be defined as rules for different implementations.

Referring now to FIG. 1, a network infrastructure device 100 such as a switch/router 105 is illustrated in a block diagram. In general, a router has two types of network element components organized onto separate planes illustrated as control plane 110 and data plane 115. In addition, a typical switch/router 105 may include processing resources and local data storage 120. Depending on the capabilities of a particular switch/router 105 different types of processing resources and local storage (for internal device usage) may be present. In general, higher capacity switch/router 105 implementations will include substantial processing resources and memory while simpler (e.g., low capacity) devices will contain less internal resources. Local storage for internal device usage is not to be confused with attachable or integrated storage devices (e.g., SSDs) for network use as described throughout this disclosure.

Control plane 110, for example in a router may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115.

A router may also use a forwarding plane (e.g., part of the data plane 115) that contains different forwarding paths for information from different ports or different destination addresses (e.g., forwarding path A 116 or forwarding path Z 117). In general, the router forwards data packets between incoming (e.g., ports 150-159) and outgoing interface connections (e.g., ports 160-159). The router forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., switch/router 105) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets, each with a different network prefix.

Also illustrated in FIG. 1, bidirectional arrow 107 indicates that control plane 110 and data plane 115 may work in a coordinated fashion to achieve the overall capabilities of switch/router 105. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1, includes several example functional control blocks. Additional control blocks are possible depending on the capabilities of a particular implementation of a switch/router 105. Block 111 indicates that control plane 110 may have associated build information regarding a software version of control code that is currently executing on switch/router 105. In addition, that software version may include configuration settings to determine how switch/router 105 and its associated control code perform different functions.

Figure 2A:
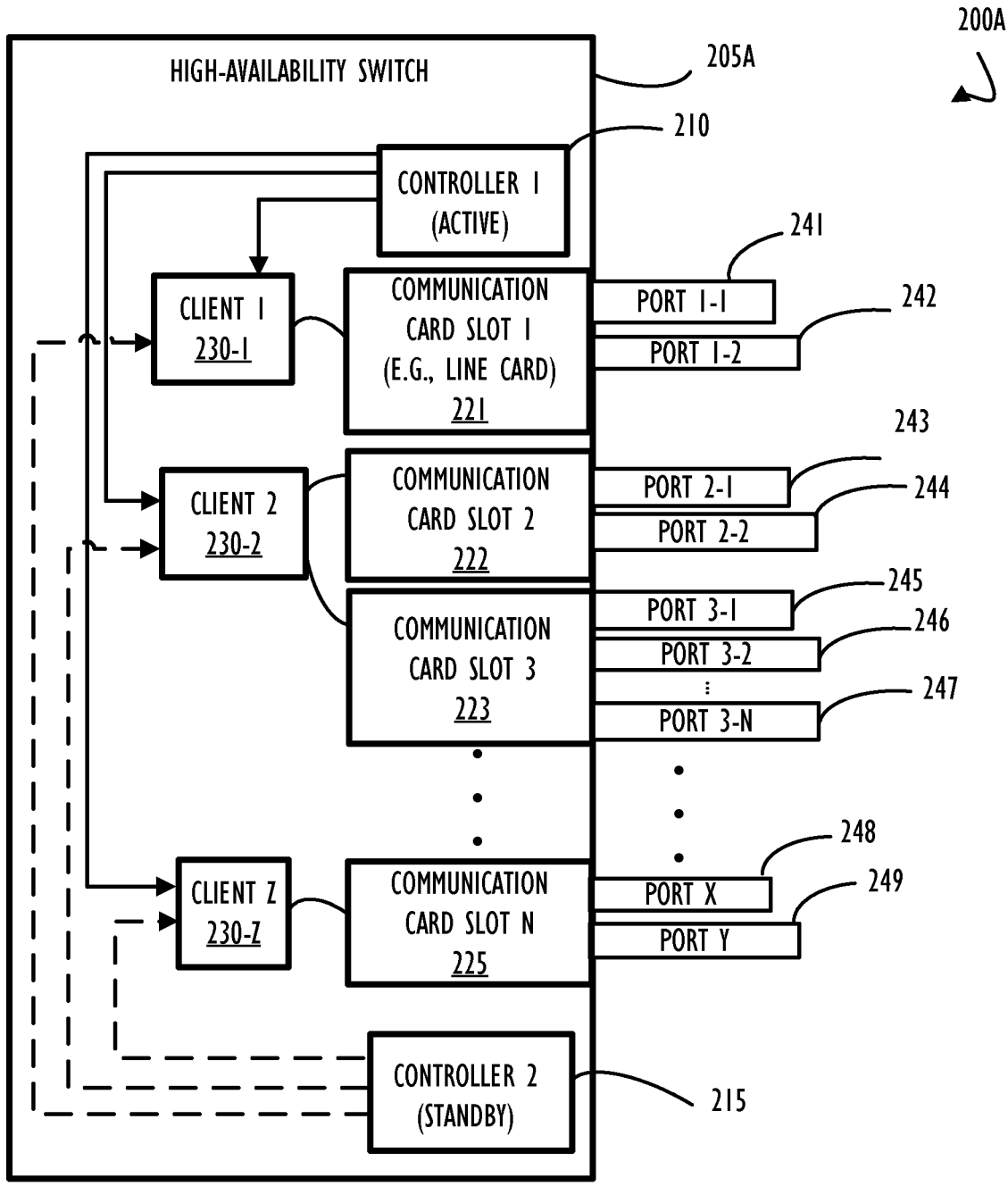
FIG. 2A is a functional block diagram representing an example of a high-availability switch, according to one or more disclosed implementations.
Figure 2B:
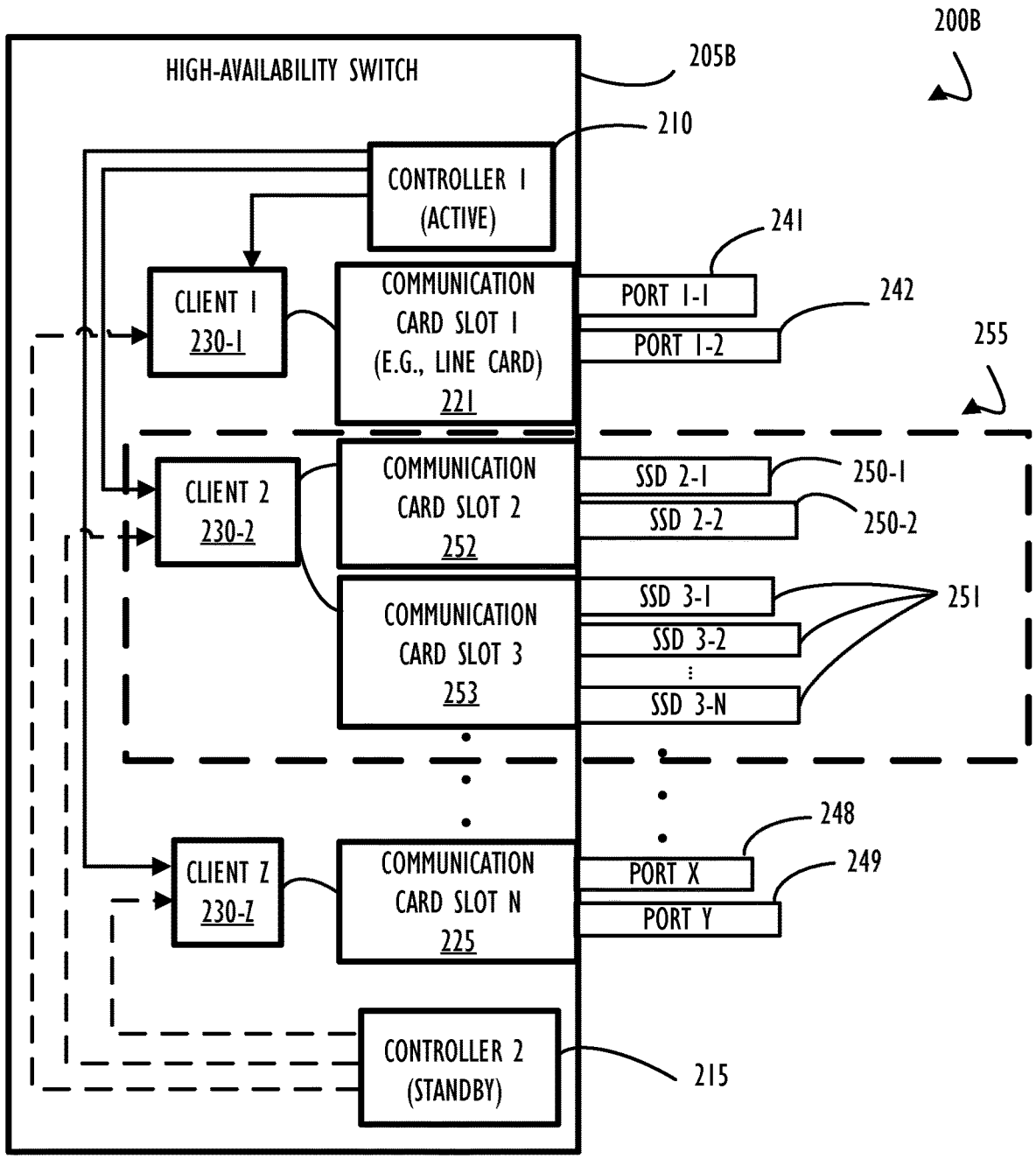
FIG. 2B is a functional block diagram representing an example of a high-availability switch including SSD integrated with the high-availability switch as an example of an enhanced storage capable switch, according to one or more disclosed implementations.

Many different configuration settings for both the software and the device itself are possible and describing each is beyond the scope of this disclosure. However, the disclosed automatic detection and routing of NVMe-oF network packets may be implemented in one or more functional components of network infrastructure device 105. Rules to be used to identify NVMe-oF network packets and processing logic to perform the automatic identification may be incorporated into these one or more functional components. Further, in some implementations such as shown in FIGS. 2A-2B, a network infrastructure device 100 (e.g., switch/router 105 or HA switch 200A and 200B) may be composed of multiple devices in different HA configurations. One or more devices in switch/router 105 may be configured to implement the automatic detection and routing of NVMe-oF network packets.

Continuing with FIG. 1, block 111 indicates that different types of routing information and connectivity information may be known to switch/router 105 (as an example of network infrastructure device 100) and control plane 110. Block 112 indicates that an information store may be accessible from control plane 110 and include forwarding tables or NAT information as appropriate. Block 113 indicates that control plane 110 may also be aware of forwarding decisions and other processing information. Although FIG. 1 illustrates these logical capabilities within control plane 110 they may actually be implemented outside of, but accessible to, control plane 110.

Referring now to FIG. 2A, an example of a high-availability switch 205A is illustrated in block diagram 200A. High-availability switch 205A is illustrated with two controllers. Controller 1 (210) is identified as the "active" controller and Controller 2 (215) is identified as the "standby" controller. As explained in more detail below, a high-availability switch, such as high-availability switch 205, may have any number of controllers and typically has at least two. In some configurations, the controllers work as a primary/backup pair with a dedicated active controller and a dedicated standby controller. In a primary/backup configuration, the primary performs all network functions and the standby, as its name suggests, waits to become the active if a failover condition is reached. Failover may be automatic or manual and may be implemented for different components within a higher-level HA device. In general, failover at a conceptual high level refers to the active and standby component switching roles so that the standby becomes the active and the active (sometimes after restarting or replacement) becomes the standby. In the context of SSD devices integrated into a network switch, one SSD may act as a primary in a redundant pair of SSDs that are kept up to date with data writes such that the backup of the redundant pair may take over (e.g., the backup is a hot standby) automatically when (for any number of reasons) the primary SSD is not available.

High-availability switch 205A also includes a plurality of communication cards (e.g., Card Slot 1 (221), Card Slot 2 (222), Card Slot 3 (223), and Card Slot N (225)) that may each have a plurality of communication ports configured to support network communication. A card slot, such as Card Slot 1 (221) may also be referred to as a "line card" and have a plurality of bi-directional communication ports (as well as a management port (not shown)). Card Slot 1 (221) is illustrated with port 1-1 (241) and port 1-2 (242) and may represent a "card" that is plugged into a slot (e.g., communication bus connection) of a backplane (e.g., communication bus) of high-availability switch 205A. Other connections and connection types are also possible (e.g., cable connection, NVMe device). Also, in FIG. 2A, Card Slot 2 (222) is illustrated with port 2-1 (243) and port 2-2 (244); Card Slot 3 (223) is illustrated with ports 3-1 (245), 3-2 (246), and port 3-N (247); and Card Slot N (225) is illustrated with port X (248) and port Y (249).

To support communications between a controller (e.g., an active and/or a standby controller) in a switch and client devices connected to that switch, a number of communication client applications may be executing on a given switch. Client applications executing on a switch may assist in both communication to connected clients and configuration of hardware on the switch (e.g., ports of a line card). In some cases, client applications are referred to as "listeners," in part, because they "listen" for a communication or command and then process what they receive. For high-availability switch 205A, an example client application is client 1 (230-1) which is illustrated to support communication from either the active or the standby controller to devices connected through Card Slot 1 (221). In some example implementations, a listener may be configured to automatically identify and route NVMe-oF network packets. Other implementations where the automatic identification is performed by hardware components or other software components are also possible.

A second example client application in FIG. 2A is client 2 (230-2) which is illustrated to support communication from either controller to both of Card Slot 2 (222) and Card Slot 3 (223). Finally, client Z (230-Z) is illustrated to support communication from both controllers to Card Slot N (225). Dashed lines in block diagram 200 from standby controller 2 to client applications indicate that the standby controller may be communicatively coupled to a communication card slot via a client application but may not be transmitting significant data because of its standby status. Solid lines in block diagram 200 from active controller 1 to client applications indicate an active status with likely more communication taking place. Also note that a single client may be configured to support more than one (or even part of one) communication Card Slot (line card) as illustrated with client 2 (230-2) supporting both of Card Slot 2 (222) and Card Slot 3 (223) concurrently. Upper limits on the number of card slots supported by a client may be an implementation decision based on performance characteristics or other factors of the switch and its internal design.

Referring to FIG. 2B, block diagram 200B illustrates HA switch 205B as a variation of HA switch 205A discussed above. As illustrated, in area 255 (outlined by a dashed box), HA switch 205B integrates multiple SSD components that may be used to provide network attached storage for remote devices. As illustrated, SSD devices may be used in place of communication ports for HA switch 205B. Specifically, communication Card Slot 2 (252) integrates SSD 2-1 (250-1) and SSD 2-2 (250-2). To achieve an HA configuration and depending on implementation specifications, SSD 2-1 (250-1) may be paired with SSD 2-2 (250-2) as a redundant pair of storage devices or may be implemented independently from each other. Because both SSD 2-1 (250-1) and SSD 2-2 (250-2) are both on Card Slot 2 (252) it may be desirable to provide a redundant pairing where both a primary and backup of a redundant pair are not on the same line card. Specifically, an SSD may be paired for redundancy with an SSD on a different line card. Either implementation is possible. One possible benefit of having inputs and outputs (or redundancy pairs) on the same line card would be that communication between devices on a same line card would not have to traverse a chassis fabric (i.e., the inter-device communication would be local to the line card fabric). Of course, different implementation criteria may be considered to determine a most optimal implementation for a given application solution. Additionally, it is possible that a single line card may have a combination of integrated SSD components and communication ports.

As also illustrated in example HA switch 205B, a line card may communicate with any number of integrated SSD components. Specifically, area 255 illustrates that SSD 3-1, SSD 3-2, and SSD 3-N (all referenced with element reference number 251) may be integrated with (or connected to) Card Slot 3 (253). In this example, client 2 (230-2) may adapt to communicate with line cards having integrated SSD components and other computing devices (e.g., outside of area 255) may not be aware of detailed implementations within area 255. That is, the disclosed implementation of SSD components integrated within HA switch 205B may be transparent to external devices and other components of HA switch 205B. Although client 2 (230-2) is illustrated in block diagram 200B as a potential software (or firmware) module, it is possible to implement functionality of client 2 (230-2) completely (or at least partially) within hardware logic (i.e., silicon based logic) of HA switch 205B. One of ordinary skill in the art, given the benefit of this disclosure, will recognize that many different implementations of software, firmware, and hardware logic may be used to achieve disclosed techniques of automatically detecting, routing, and prioritizing NVMe packets at a higher processing priority with respect to packets of other protocols to achieve lossless communication flows for network attached storage devices (NVMe-oF devices in particular).

Figure 3A:
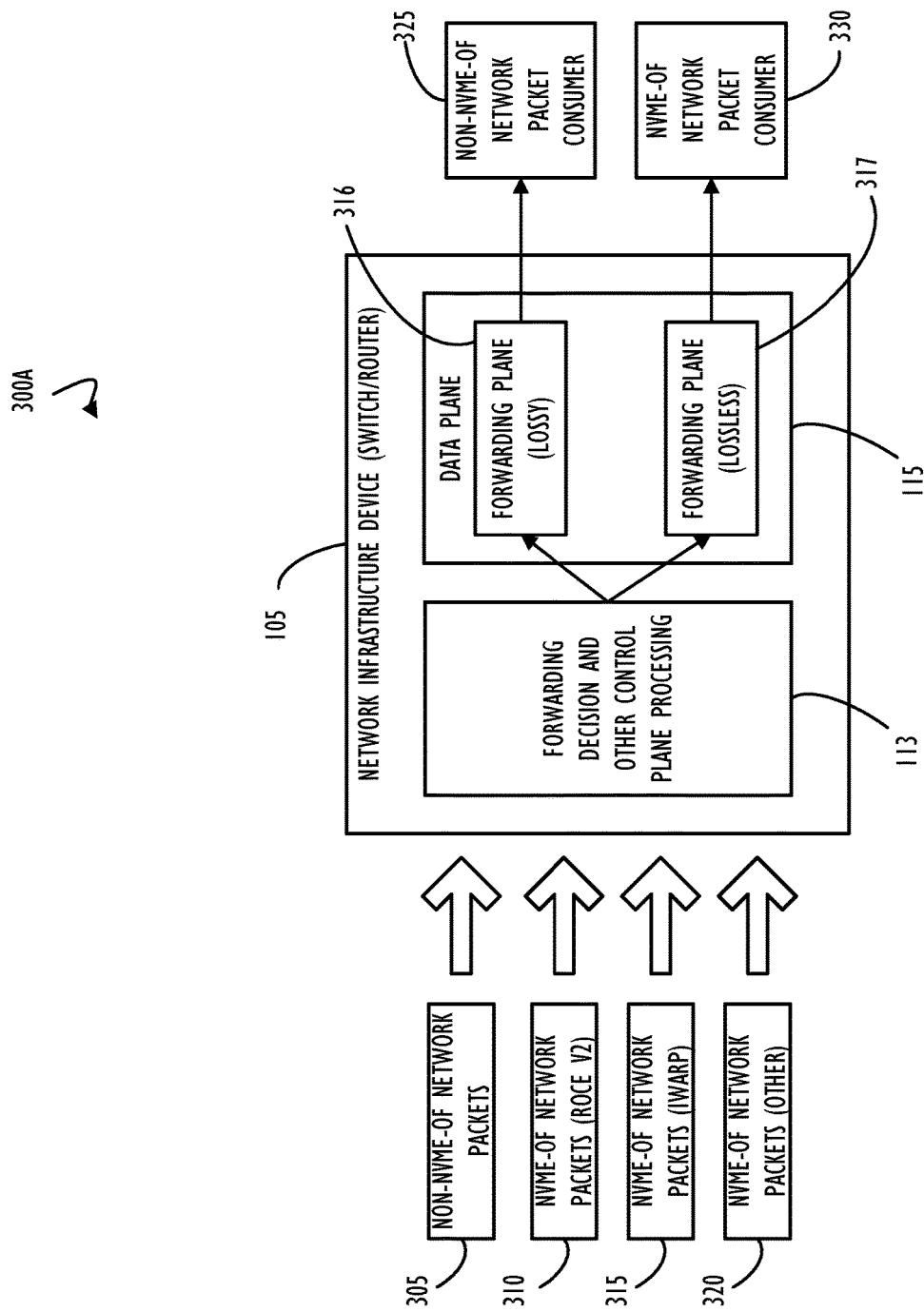
FIG. 3A is a block diagram representing an example of network packet routing utilizing an intervening network infrastructure device (or component of a device), according to one or more disclosed implementations.

Referring now to FIG. 3A, an example of network packet routing 300A when utilizing a network switch/router such as switch/router 105 of FIG. 1 is illustrated. As mentioned above, network packets for multiple protocols may be transmitted simultaneously on a same physical medium (or data transport layer in the case of wireless networks) of a network communication link. Accordingly, network packets of multiple protocols may be concurrently received at one or more ports of a network switch/router (e.g., network switch/router 105). For example, non-NVMe-of network packets 305 may be received in conjunction with multiple NVMe-oF protocols such as RoCE V2 310, IWARP 315, or any other NVMe-oF protocol 320. According to disclosed implementations, network packets may be received by the network switch/router and routed to internal sub-systems discussed above. For example, forwarding decision and control plane processing 113 where detection techniques based on the above-referenced packet analysis (e.g., rules-based signature analysis) may be executed to discern NVMe-oF network packets from non-NVMe-oF network packets. The identified network packets may then be forwarded onto one or more specific routing paths in data plane 115. In some example implementations, forwarding decision and control plane processing 113 may be configured to forward non-NVMe-oF network packets to lossy forwarding plane 316 that is configured to forward network packets for protocols that may be resilient to loss. The configuration may alternatively forward NVMe-oF network packets to lossless forwarding plane 317 that is configured to never lose network packets (e.g., never drop a packet) as may be desired for NVMe-oF protocols.

To process all network packets received at example network infrastructure device 100 (e.g., switch/router 105), lossy forwarding plane 316 may work in parallel with lossless forwarding plane 317 to deliver received network packets to a plurality of network packet consumers (e.g., non-NVMe-oF network packet consumers 325 and NVMe-oF network packet consumers 330). Thus, lossy communications may be delivered to non-NVMe-oF packet consumers 325 while lossless communications may be delivered (possibly at a higher priority relative to non-NVMe-oF network packets) to NVMe-oF network packet consumers 330.

Figure 3B:
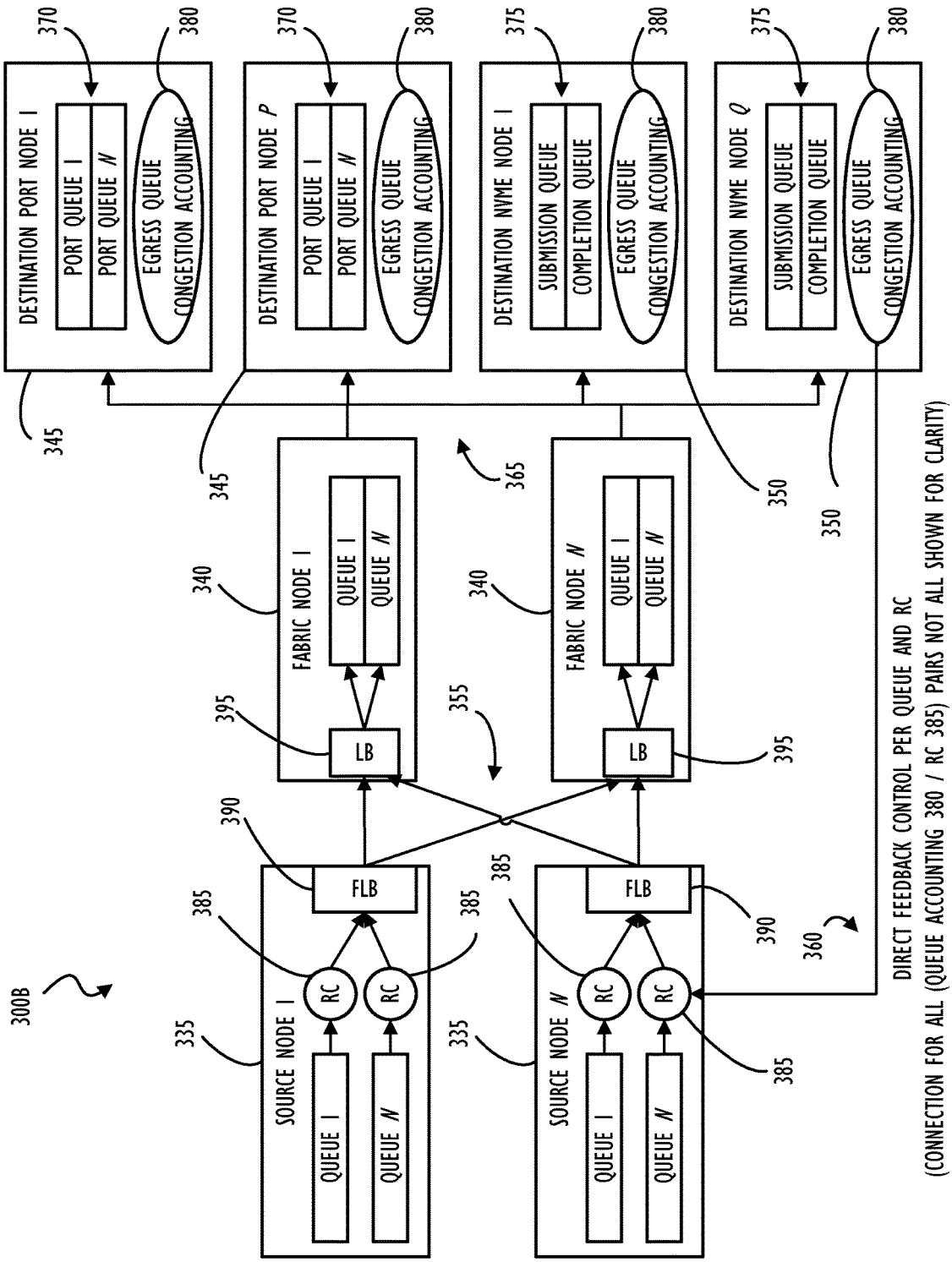
FIG. 3B is a block diagram representing an example of one internal queue routing mechanism that may be used by an intervening network infrastructure device (or component of a device), according to one or more disclosed implementations.

Referring to FIG. 3B, an example block diagram showing one example internal queue routing mechanism 300B that may be used by a network infrastructure device 100 (referring to FIG. 1) is shown. In this example, the concept of node may be considered a logical sub-system of a network infrastructure device or a logical processing block implemented internally or externally of a network infrastructure device. In the example, a plurality of source nodes 335 may receive network packets in a plurality of queues contained in the source node 335. Each queue in source node 335 may be coupled with rate controlling (RC) logic 385. Each source node 335 may connect to multiple fabric nodes 340 through the fabric load balancer (FLB) 390.

Connections from source nodes 335 to multiple fabric nodes 340 forms a plurality of alternate paths 355 where network packets may be sent to fabric nodes 340. Fabric nodes 340 may also have multiple internal queues that receive network packets sent from source nodes 335. The fabric nodes 340 may also have a load balancing mechanism 395 that routes received packets to queues internal to the fabric node 340. Fabric nodes 340 may be commonly coupled to destination nodes through a connection mechanism such as that illustrated by bus 365. Destination nodes may be a plurality of nodes such as destination port nodes 345 and destination NVMe nodes 350. For brevity purposes, only two destination node types are illustrated in this example but there many types of nodes are possible and may be connected to fabric nodes 340.

In one example implementation, fabric nodes 340 may be configured to deliver network packets to destination nodes base on the type of network packet that is to be delivered. For example, non-NVMe-oF packets may be delivered to one or more destination port nodes 345. The destination port node 345 may deliver the network packet to one or more internal queues 370. In internal queues 370 may be further segregated, based on, for example, handling priority of the network packet. In another example, Fabric nodes 340 may deliver NVMe-oF network packets to destination NVMe nodes 350. Destination NVMe node 350 may have one or more queue pairs 375 such as the submission queue (where network packets are submitted to the device for processing) and a completion queue (where responses for processed network packets are sent to a destination on the network). In the context of an SSD interface, submission queues represent reads and writes and completion queues are for data transfer responsive to those commands.

Any destination node (345, 350) may further contain an egress queue congestion accounting function 380. Egress queue congestion accounting function 380 may be implemented in software, firmware, or hardware logic and may be used to monitor the node's capacity to accept new network packets. According to disclosed implementations, egress queue congestion accounting 380 may be coupled (illustrated with line 365) to one or more source node's 335 rate controlling logic 385. In one example implementation, egress queue accounting 380 may be used to control packet flow based on a node being at or near capacity for handling new network packets. For purposes of brevity, the diagram illustrates only one such coupling with line 365, but actual implementations may couple all egress queue congestion accounting 380 instances with all rate controlling logic 385 instances in all source nodes 335.

Egress queue congestion accounting 380, when coupled with the rate controlling logic 385 may utilize direct feedback control 360 to form a feedback loop between source nodes 335 and destination nodes 345, 350 to prevent the need for network packets to consume resources in fabric nodes 340 when a destination node 345, 350 may not have the capacity to handle more network packets. Source node 335, when informed to control the ingress rate of network packets, may handle additional received network packets based on the type of packet received. For example, if a source node 335 receives an NVMe-oF network packet after being instructed to control the rate, the network infrastructure device may inform the sender to temporarily stop sending network packets. In another example, if a source node 335 receives a non-NVMe-oF network packet after being instructed to control the rate, the source node may drop the packet. Other implementations of actual packet handling based on congestion are also possible.

Figure 4:
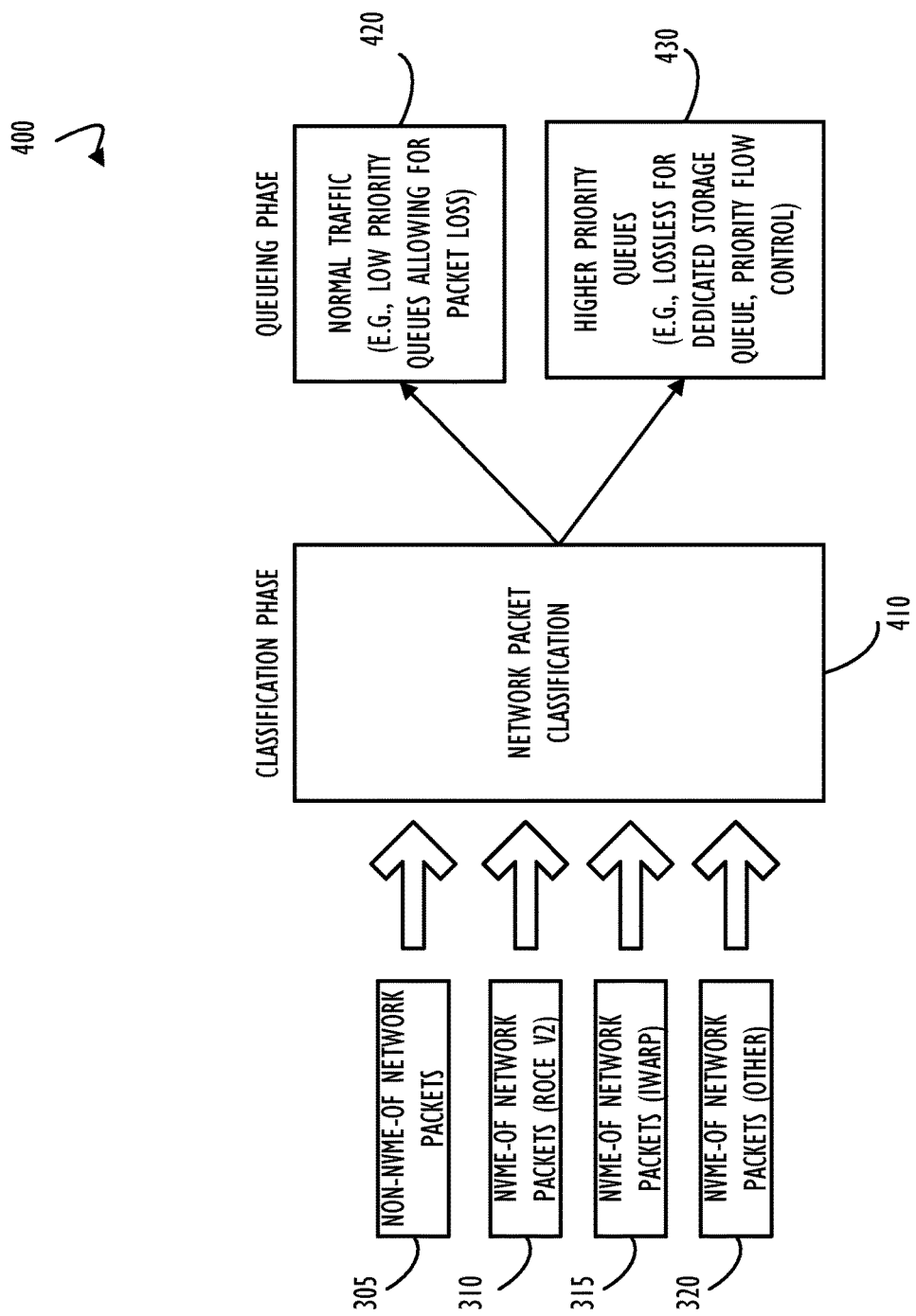
FIG. 4 is a block diagram representing a high-level example view of actions that may be taken when implementing automatic NVMe-oF network packet detection, prioritization, and routing, according to one or more disclosed implementations.

Referring to FIG. 4, a block diagram illustrates a high-level example view of one control flow 400 that may be implemented for automatic NVMe-oF network packet detection and routing. As was explained above with reference to FIG. 3A and repeated in FIG. 4, non-NVMe-oF network packets 305 combined with NVMe-oF network packets 310, 315, and 320 may be concurrently received by a network infrastructure device (not shown). Upon receipt, a classification phase 410 may be implemented for automatic identification of a protocol signature, for example, to initiate one or more classification techniques as part of classification phase 410. In general, this example illustrates that classification phase 410 processes network packets to identify the type of the network packet (e.g., to determine how to prioritize and route based on type of packet processing requirements). Normal network traffic (generally classified here as "non-NVMe-oF network packets") may be routed by a queuing phase to low priority queues 420. Network packets classified as NVMe-oF network packets may be routed to queues for dedicated storage and may utilize priority flow control (PFC) as illustrated by higher priority queues 430. Higher priority queues 430 may include handling the NVMe-oF packets such that the packets are guaranteed to be delivered to the intended destination (e.g., treated as a lossless protocol).

Figure 5:
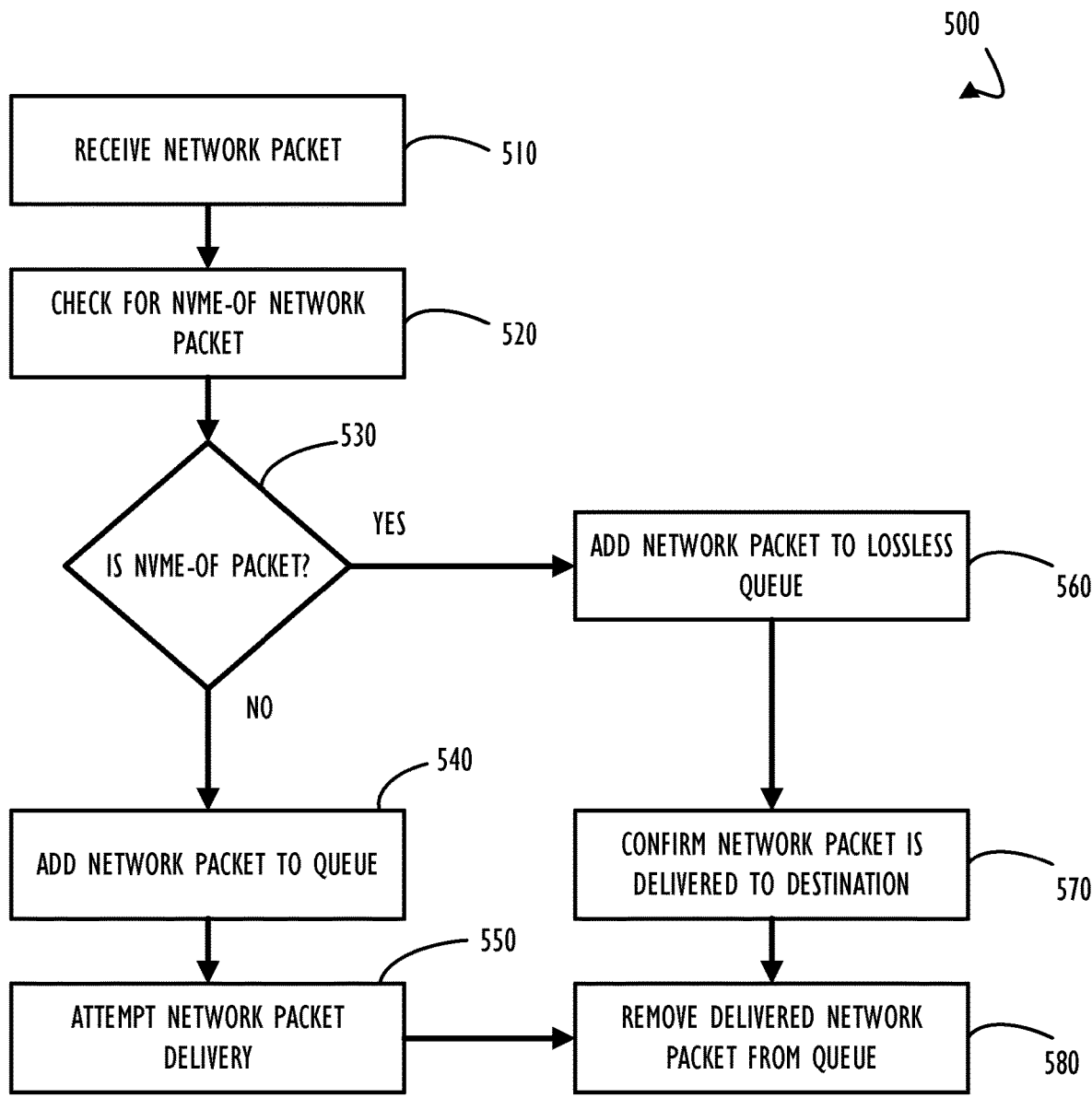
FIG. 5 is an example process flow diagram depicting an example method for automatically identifying and routing NVMe-oF network packets, according to one or more disclosed implementations.

Referring to FIG. 5, a process flow diagram depicting an example of the logic applied for automatically identifying and routing NVMe-oF network packets is illustrated as method 500. Example method 500 begins at block 510 where a network packet of any type is received. Continuing to block 520, a plurality of detection techniques may be used to check if the network packet type corresponds to an NVMe-oF protocol. For example, network packets may be analyzed to determine if they can be identified based on a signature of the contents or attributes of the network packet. Continuing to decision 530, if the network packet is identified as a network packet for an NVMe-oF protocol then the YES prong of the diamond decision block is followed to block 560. In block 560, the NVMe-oF network packet is added to a lossless queue. Continuing to block 570, the NVMe-oF network packet previously added to the queue is verified as having been delivered to the intended destination of the NVMe-oF network packet before continuing to block 580 where the network packet is removed from the queue.

Returning to decision 530, if the network packet is not found to be an NVMe-oF network packet (the NO prong of the decision 520) flow continues to block 540. In block 540, the network packet is added to a queue that may be processed with or without loss depending on the configured handling for the type of network packet. Continuing to block 550, one or more attempts are made to deliver the network packet. Each of the one or more attempts may follow the configured handling for the type of network packet. If the handling is configured to be lossless, the attempt to deliver the packet may include waiting for delivery confirmation. If the handling is not configured to be lossless, the delivery attempt may be aborted (e.g., resulting in a dropped packet). After the appropriate handling of the network packet delivery (e.g., processing a configurable number of retries or waiting a configurable amount of time), flow continues to block 580 where the network packet is removed from the queue.

Figure 6:
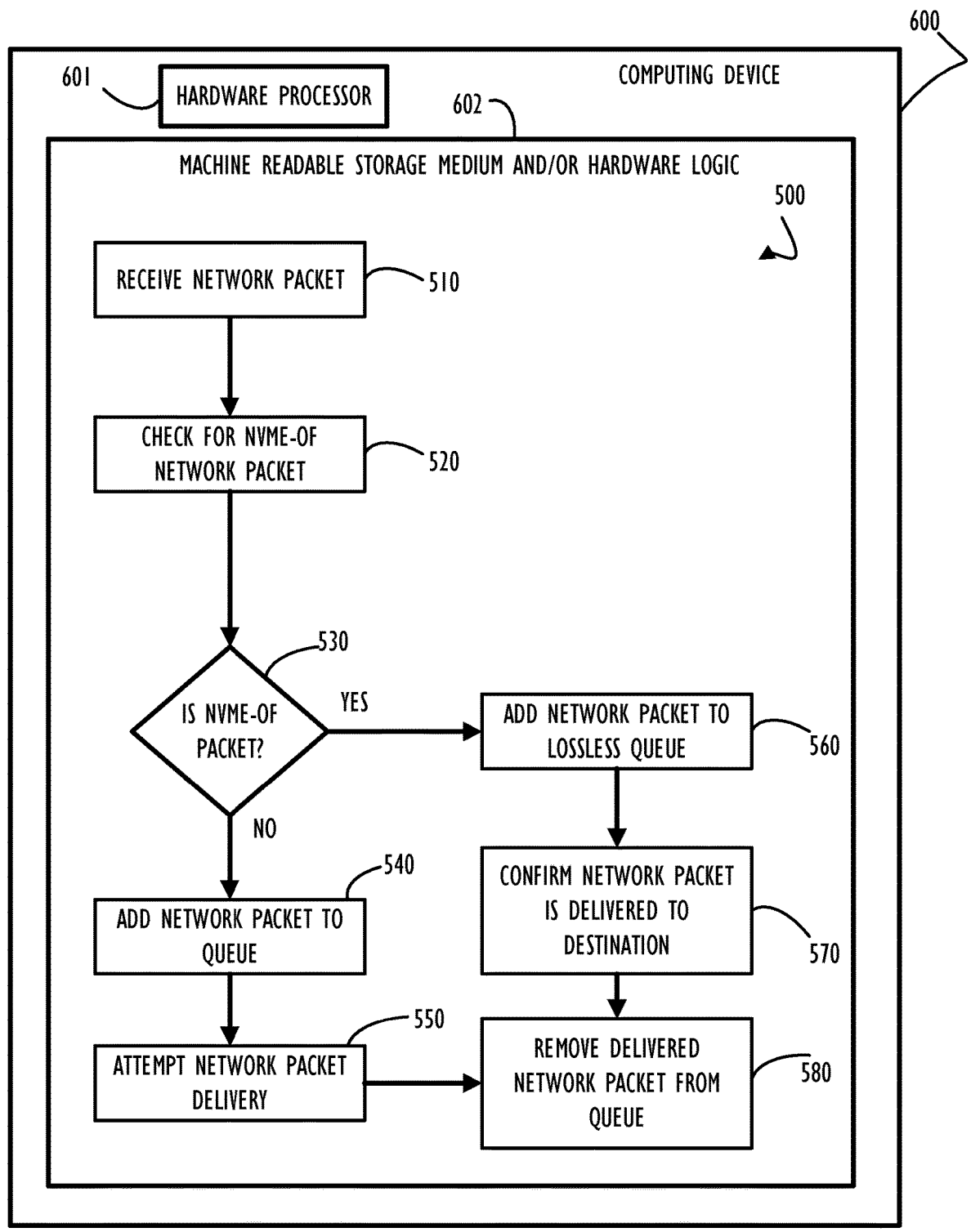
FIG. 6 is an example computing device, with a hardware processor, and accessible machine-readable instructions stored on a machine-readable medium that may be used to implement the example method of FIG. 5, according to one or more disclosed implementations.

Referring now to FIG. 6, shown is an example computing device 600, with a hardware processor 601, and accessible machine-readable instructions stored on a machine-readable medium and/or hardware logic 602 that may be used to perform automatic NVMe-oF network packet routing, according to one or more disclosed example implementations. FIG. 6 illustrates computing device 600 configured to perform the flow of method 500 as an example. However, computing device 600 may also be configured to perform the flow of other methods, techniques, functions, or processes described in this disclosure. In this example of FIG. 6, machine-readable storage medium 602 includes instructions to cause hardware processor 601 to perform blocks 510-580 discussed above with reference to FIG. 5. However, in other examples, different implementations of method 500 are possible, including hardware circuitry configured on a chip to implement all or part of method 500 in conjunction with an overall implementation of disclosed techniques to provide integrated SSD within a network infrastructure device and to automatically separate and route network packets based on a protocol signature identified based on network packet analysis (e.g., network packet signature identified using a rules-based implementation). In these examples, hardware processor 601 may be part of the hardware circuitry, for example, built on silicone (e.g., ASIC, etc.) instead of being a central processing unit.

A machine-readable storage medium, such as 602 of FIG.6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
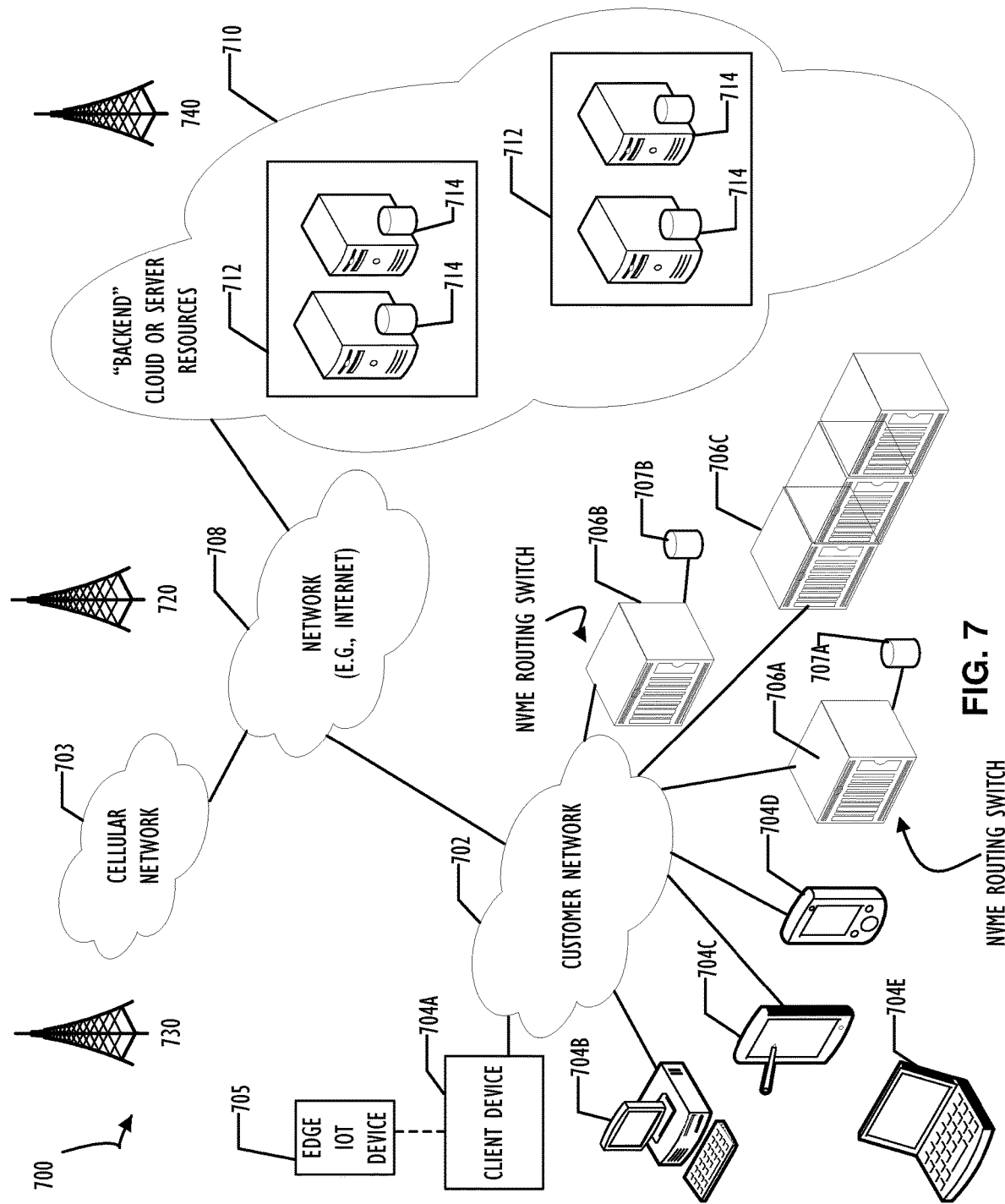
FIG. 7 represents a computer network infrastructure that may be used to implement all or part of the disclosed automatic NVMe-oF network packet detection and routing for a network device, according to one or more disclosed implementations.

FIG. 7 represents a computer network infrastructure 700 that may be used to implement all or part of the disclosed automatic NVMe-oF network packet detection and routing technique, according to one or more disclosed embodiments. Network infrastructure 700 includes a set of networks where embodiments of the present disclosure may operate. Network infrastructure 700 comprises a customer network 702, network 708, cellular network 703, and a cloud service provider network 710. In one embodiment, the customer network 702 may be a local private network, such as local area network (LAN) that includes a variety of network devices that include, but are not limited to switches, servers, and routers.

Each of these networks can contain wired or wireless programmable devices and operate using any number of network protocols (e.g., TCP/IP) and connection technologies (e.g., WiFi® networks, or Bluetooth®. In another embodiment, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability switches or network devices using methods and techniques such as those described above.

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 7040, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the HA switches (e.g., an NVMe Routing Switch) outlined above. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one embodiment, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically achieve near perfect uptime availability and may use the disclosed techniques, methods, and systems to provide that level of service.

Figure 8:
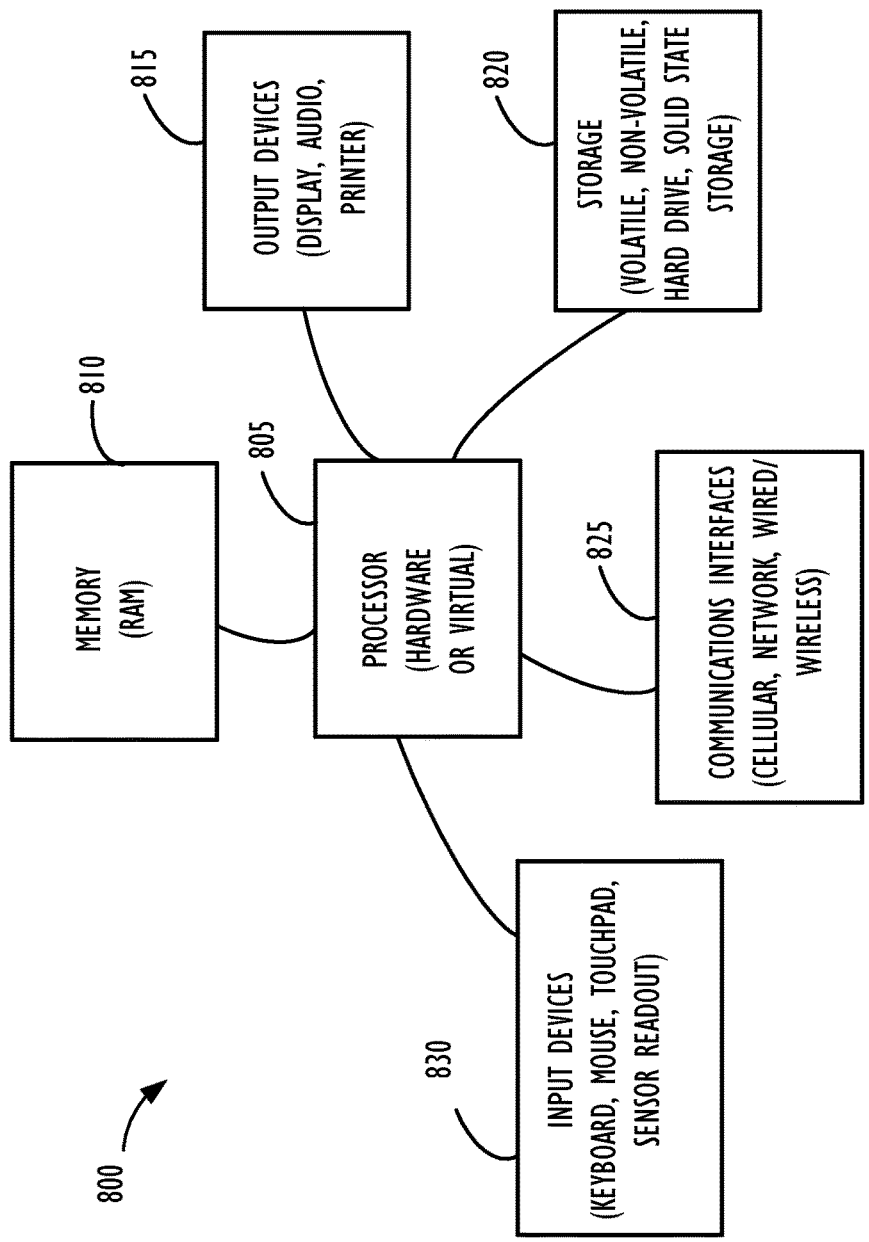
FIG. 8 illustrates a computer processing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU), a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method, comprising:
obtaining a network packet at a network infrastructure device;
determining whether the network packet is a Non-Volatile Memory Express (NVMe) packet based on a signature of the network packet that is uniquely associated with an NVMe protocol, wherein the signature comprises at least an address field or a port number, wherein determining whether the network packet is an NVMe packet comprises applying one or more rules based on the signature, and wherein updating the rules updates the unique association between the signature and the NVMe protocol;

based on a determination that the network packet is an NVMe packet, redirecting the network packet to a first processing path comprising one or more lossless queues, wherein a respective lossless queue comprises a submission queue that queues network packets submitted for processing and a completion queue that queues responses for processed network packets; and based on a determination that the network packet is not an NVMe packet, redirecting the network packet to a second processing path of a lower priority than the first processing path.

2. The method of claim 1, wherein the NVMe protocol is selected from the group consisting of: remote direct memory access (RDMA) over converged ethernet (RoCE), Internet wide-area RDMA (iWARP), and NVMe over transport control protocol (TCP).

3. The method of claim 1, wherein determining whether the network packet is an NVMe packet comprises identifying the network packet as a remote direct memory access (RDMA) over converged Ethernet (RoCE) packet.

4. The method of claim 1, wherein determining whether the network packet is an NVMe packet comprises identifying the network packet as a remote direct memory access (RDMA) over converged ethernet version 2 (RoCEV2) packet by identifying the network packet as a level 3 protocol over user datagram protocol (UDP).

5. The method of claim 1, wherein determining whether the network packet is an NVMe packet comprises identifying the network packet as an Internet wide-area remote direct memory access (RDMA) protocol (iWARP) packet.

6. The method of claim 1, wherein determining whether the network packet is an NVMe packet comprises identifying the network packet as an NVMe over transport control protocol (TCP) packet based on the signature.

7. The method of claim 1, wherein determining whether the network packet is an NVMe packet is performed using hardware logic.

8. The method of claim 1, wherein the network infrastructure device comprises a network switch including multiple line cards.

9. A non-transitory computer readable medium storing instructions, that when executed by one or more processing units of a network infrastructure device, cause the network device to:

obtain a network packet at the network infrastructure device;

determine whether the network packet is a Non-Volatile Memory Express (NVMe) packet based on a signature of the network packet that is uniquely associated with an NVMe protocol, wherein the signature comprises at least an address field or a port number, wherein determining whether the network packet is an NVMe packet comprises applying one or more rules based on the signature, and wherein updating the rules updates the unique association between the signature and the NVMe protocol;

based on a determination that the network packet is an NVMe packet, redirect the network packet to a first processing path comprising one or more lossless queues, wherein a respective lossless queue comprises a submission queue that queues network packets submitted for processing and a completion queue that queues responses for processed network packets; and based on a determination that the network packet is not an NVMe packet, redirect the network packet to a second processing path of a lower priority than the first processing path.

10. The non-transitory computer readable medium of claim 9, wherein the NVMe protocol is selected from the group consisting of: remote direct memory access (RDMA) over converged ethernet (RoCE), Internet wide-area RDMA (iWARP), and NVMe over transport control protocol (TCP).

11. The non-transitory computer readable medium of claim 9, wherein the instructions to cause the network device to determine whether the network packet is an NVMe packet further include instructions to identify the network packet as a remote direct memory access (RDMA) over converged ethernet (RoCE) packet.

12. The non-transitory computer readable medium of claim 9, wherein the instructions to cause the network device to determine whether the network packet is an NVMe packet further include instructions to identify the network packet as a remote direct memory access (RDMA) over converged ethernet version 2 (RoCEV2) packet.

13. The non-transitory computer readable medium of claim 9, wherein the instructions to cause the network device to determine whether the network packet is an NVMe packet further include instructions to identify the network packet as an Internet wide-area remote direct memory access (RDMA) protocol (iWARP) packet.

14. The non-transitory computer readable medium of claim 9, wherein the instructions to cause the network device to determine whether the network packet is an NVMe packet further include instructions to identify the network packet as an NVMe over transport control protocol (TCP) packet.

15. An Ethernet switch comprising:

one or more processing devices; and memory storing instructions that when executed by the one or more processing devices cause the Ethernet switch to:

obtain a network packet at the network infrastructure device;

determine whether the network packet is a Non-Volatile Memory Express (NVMe) packet based on a signature of the network packet that is uniquely associated with an NVMe protocol, wherein the signature comprises at least an address field or a port number, wherein determining whether the network packet is an NVMe packet comprises applying one or more rules based on the signature, and wherein updating the rules updates the unique association between the signature and the NVMe protocol;

based on a determination that the network packet is an NVMe packet, redirect the network packet to a first processing path comprising one or more lossless queues, wherein a respective lossless queue comprises a submission queue that queues network packets submitted for processing and a completion queue that queues responses for processed network packets; and based on a determination that the network packet is not an NVMe packet, redirect the network packet to a second processing path of a lower priority than the first processing path.

16. The Ethernet switch of claim 15, wherein the NVMe protocol is selected from the group consisting of: remote direct memory access (RDMA) over converged ethernet (RoCE), Internet wide-area RDMA (iWARP), and NVMe over transport control protocol (TCP).

17. The Ethernet switch of claim 15, wherein the instructions to cause the Ethernet switch to determine whether analyze the network packet is an NVMe packet further include instructions to identify the network packet as a remote direct memory access (RDMA) over converged ethernet (RoCE) packet.

18. The Ethernet switch of claim 15, wherein the instructions to cause the Ethernet switch to determine whether the network packet is an NVMe packet further include instructions to identify the network packet as a remote direct memory access (RDMA) over converged ethernet version 2 (RoCEV2) packet by identifying the network packet as a level 3 protocol over user datagram protocol (UDP).

19. The Ethernet switch of claim 15, wherein the instructions to cause the Ethernet switch to determine whether the network packet is an NVMe packet further include instructions to identify the network packet as an Internet wide-area remote direct memory access (RDMA) protocol (iWARP) packet.

20. The Ethernet switch of claim 15, wherein the instructions to cause the Ethernet switch to determine whether the network packet is an NVMe packet further include instructions to identify the network packet as an NVMe over transport control protocol (TCP) packet.

* * * * *